United States Patent
Miyazawa

(10) Patent No.: US 9,885,637 B2
(45) Date of Patent: Feb. 6, 2018

(54) TIRE ROLLING RESISTANCE TESTING METHOD AND TESTING DEVICE

(71) Applicant: SUMITOMO RUBBER INDUSTRIES, LTD., Kobe-shi, Hyogo (JP)

(72) Inventor: Ken Miyazawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 40 days.

(21) Appl. No.: 15/109,607

(22) PCT Filed: Oct. 30, 2014

(86) PCT No.: PCT/JP2014/078918
§ 371 (c)(1),
(2) Date: Jul. 1, 2016

(87) PCT Pub. No.: WO2015/111276
PCT Pub. Date: Jul. 30, 2015

(65) Prior Publication Data
US 2016/0327455 A1    Nov. 10, 2016

(30) Foreign Application Priority Data

Jan. 24, 2014    (JP) .................... 2014-011612

(51) Int. Cl.
*G01M 17/00* (2006.01)
*G01M 17/02* (2006.01)
(Continued)

(52) U.S. Cl.
CPC ........... *G01M 17/022* (2013.01); *B60C 99/00* (2013.01); *G01M 17/0072* (2013.01);
(Continued)

(58) Field of Classification Search
CPC ............. G01M 17/022; G01M 17/013; G01M 17/0072; G01M 17/0074; G01M 17/0076; G01L 5/0009; G01L 5/136
See application file for complete search history.

(56) References Cited

U.S. PATENT DOCUMENTS 4,197,736 A * 4/1980 Barrett .................... G01L 5/161
73/146
6,606,569 B1 * 8/2003 Potts ......................... G01L 5/00
702/41
(Continued)

FOREIGN PATENT DOCUMENTS

EP    2653851 A1    10/2013
JP    56-51641 A    5/1981
(Continued)

OTHER PUBLICATIONS

Extended European Search Report, dated Aug. 28, 2017, for European Application No. 14879432.4.
(Continued)

*Primary Examiner* — Paul West
(74) *Attorney, Agent, or Firm* — Birch, Stewart, Kolasch & Birch, LLP

(57) ABSTRACT

This invention improves the precision and reliability with which rolling resistance can be measured. This rolling-resistance testing method includes a rolling-resistance measurement stage and a determination stage. In the rolling-resistance measurement stage, a component force meter is used to measure the tangential axial force that occurs in a tire axle when the tire is rotated under load. In the determination stage, the axial force is measured in a no-load stopped state in which the tire has been separated from a drum, said axial force is compared to a threshold, and if the axial force is
(Continued)

greater than said threshold, a determination that an anomaly has occurred in the test is made.

5 Claims, 6 Drawing Sheets

(51) Int. Cl.
  *G01M 17/007* (2006.01)
  *G01M 17/013* (2006.01)
  *B60C 99/00* (2006.01)
(52) U.S. Cl.
  CPC .... *G01M 17/0074* (2013.01); *G01M 17/0076* (2013.01); *G01M 17/013* (2013.01)

(56) References Cited

U.S. PATENT DOCUMENTS

| 9,354,108 B2 * | 5/2016 | Iizuka | G01G 23/012 |
| 2004/0186649 A1 | 9/2004 | Ono et al. | |
| 2007/0220964 A1 | 9/2007 | Shinomoto et al. | |
| 2011/0138899 A1 | 6/2011 | Inoue et al. | |
| 2015/0143868 A1 | 5/2015 | Okada et al. | |

FOREIGN PATENT DOCUMENTS

| JP | 8-268243 A | 10/1996 |
| JP | 2004-224172 A | 8/2004 |
| JP | 2005-326314 A | 11/2005 |
| JP | 2006-300613 A | 11/2006 |
| WO | WO 2010/101159 A1 | 9/2010 |
| WO | WO 2013/191055 A1 | 12/2013 |

OTHER PUBLICATIONS

International Search Report for PCT/JP2014/078918 dated Jan. 20, 2015.
Written Opinion of the International Searching Authority for PCT/JP2014/078918 (PCT/ISA/237) dated Jan. 20, 2015.

* cited by examiner

TIRE ROLLING RESISTANCE TESTING METHOD AND TESTING DEVICE

TECHNICAL FIELD

The present invention relates to a tire rolling resistance testing method and testing device capable of improving measurement accuracy and reliability of rolling resistance.

BACKGROUND ART

As one of test methods for measuring rolling resistance of a tire, a force method described in JIS D4234 is well known. In this method, as illustrated in FIG. 6, a tire T is rotated by being pushed against an outer surface of a drum (a) that rotates at a predetermined speed V (e.g., 80 km/h in case of passenger car tires) with a predetermined vertical load (e.g., 80% of the maximum load capacity in case of passenger car tires). Then a tangential force Fx acting on the tire axle (b) is measured by a force component meter attached to the tire axle (b), and then the rolling resistance Fr is calculated based on the tangential force Fx.

Note that the tangential force Fx includes resistance of a bearing on the tire axle and parasitic loss of the air resistance on the tire T and the drum (a). Accordingly, a correction of the axial force Fx takes place to remove the parasitic loss. Here, the parasitic loss is measured by the skim test (e.g., JIS D4234) which is performed subsequent to the measurement of the tangential force Fx.

On the other hand, the force component meter amplifies a signal obtained from a sensor by an amplifier because the signal is very weak. At that time, however, "drift" in which an operating point of the amplifier shifts occurs, and it brings a problem of divergence between the actual value and the displayed value. Drift is a phenomenon that an output of the amplifier varies gradually so as to shift the zero point in the state without the addition of input signals to the two input terminals. The reason for this can be found such as variations in the temperature characteristics of transistors.

In the prior art, drift amount of an amplifier to the time was previously obtained through actual measurement and stored. A technique that corrects a value of the tangential force Fx measured by offsetting the drift amount based on the information has been proposed. Unfortunately, the drift amount is different by not only a rotational direction of the tire at the time of measurement but also each tire. Thus, it has been difficult to correct the drift amount accurately from the tangential force Fx, and therefore a fully satisfactory accuracy has not yet been achieved.

The following Patent Document 1 relates to the correction of the drift amount.

CITATION LIST

Patent Literature

Patent Document 1: Japanese Unexamined Patent Application Publication S56-51641

SUMMARY OF INVENTION

Technical Problem

The present invention has an object to provide a tire rolling-resistance testing method and testing device capable of improving the measurement accuracy and reliability of rolling resistance by identifying and excluding an abnormal measurement of rolling resistance value due to drift, based on measuring drift amount after completing measurement of a tangential force Fx, and comparing the drift amount with a previously determined threshold value KA.

Solution to Problem

The first aspect in accordance with the invention provides a tire rolling resistance testing method for measuring rolling resistance of a tire based on a tangential force (Fx) acting on a tire axle upon the tire rotating by being pushed against an outer surface of a rotating drum, the method including the steps of:

a zero point adjustment step of adjusting a value of a component force meter to zero point after mounting the tire inflated on the tire axle;

a rolling resistance measurement step of measuring a tangential force (Fx) acting on the tire axle using the component force meter upon the tire rotating with a load by being pushed against the outer surface of the rotating drum; and a determination step including:
measuring a tangential force (FxA) of the tire axle in a stop state of the tire being separated from the drum with no load, after the rolling resistance measurement step;
comparing the tangential force (FxA) with a previously determined threshold value (KA); and
determining the test as abnormal in case of the tangential force (FxA) exceeding the threshold value (KA).

In the tire rolling resistance testing method according to the invention, the tangential force (Fx) may be measured upon the tire rotating in a first direction with a load by being pushed against the outer surface of the rotating drum in the rolling resistance measurement.

In the tire rolling resistance testing method according to the invention, the rolling resistance measurement step may include a first rotation direction measurement step of measuring a tangential force (Fx1) from the tire rotating in a first direction, and a second rotation direction measurement step of measuring a tangential force (Fx2) from the tire rotating in a second direction, with a load by being pushed against the outer surface of the rotating drum.

In the tire rolling resistance testing method according to the invention, the rolling resistance measurement step may further include an intermediate determination step between the first rotation direction measurement step and the second rotation direction measurement step, and the intermediate determination step may include measuring a tangential force (FxB) of the tire axle in a stop state of the tire being separated from the drum with no load, after the first rotation direction measurement step, comparing the tangential force (FxB) with a previously determined threshold value (KB), and stopping the test as abnormal in case of the tangential force (FxB) exceeding the threshold value (KB).

The second aspect in accordance with the invention provides a tire rolling resistance testing device for performing the rolling resistance testing method, wherein the device includes a determination means to determine a result of the test abnormal in case of the tangential force (FxA) exceeding the threshold value (KA).

Advantageous Effects of Invention

The present invention includes the determination step as described above. In the determination step, a tangential force FxA of the tire axle in the stop state of the tire separated from the drum with no load, i.e., drift amount is measured after the rolling resistance measurement step. Then, the drift amount (the tangential force FxA) is compared with a previously determined threshold value KA, and the test is determined as abnormal when the drift amount exceeds the threshold value KA.

That is, the present invention is possible to identify and exclude an abnormal measurement of rolling resistance value due to drift of the force component meter. Thus, the present invention may suppress decreases in reliability and accuracy of rolling resistance which are caused by abnormal measurement of rolling resistance. As a result, the present invention may improve measurement accuracy and reliability of rolling resistance.

DESCRIPTION OF EMBODIMENTS

Figure 1:
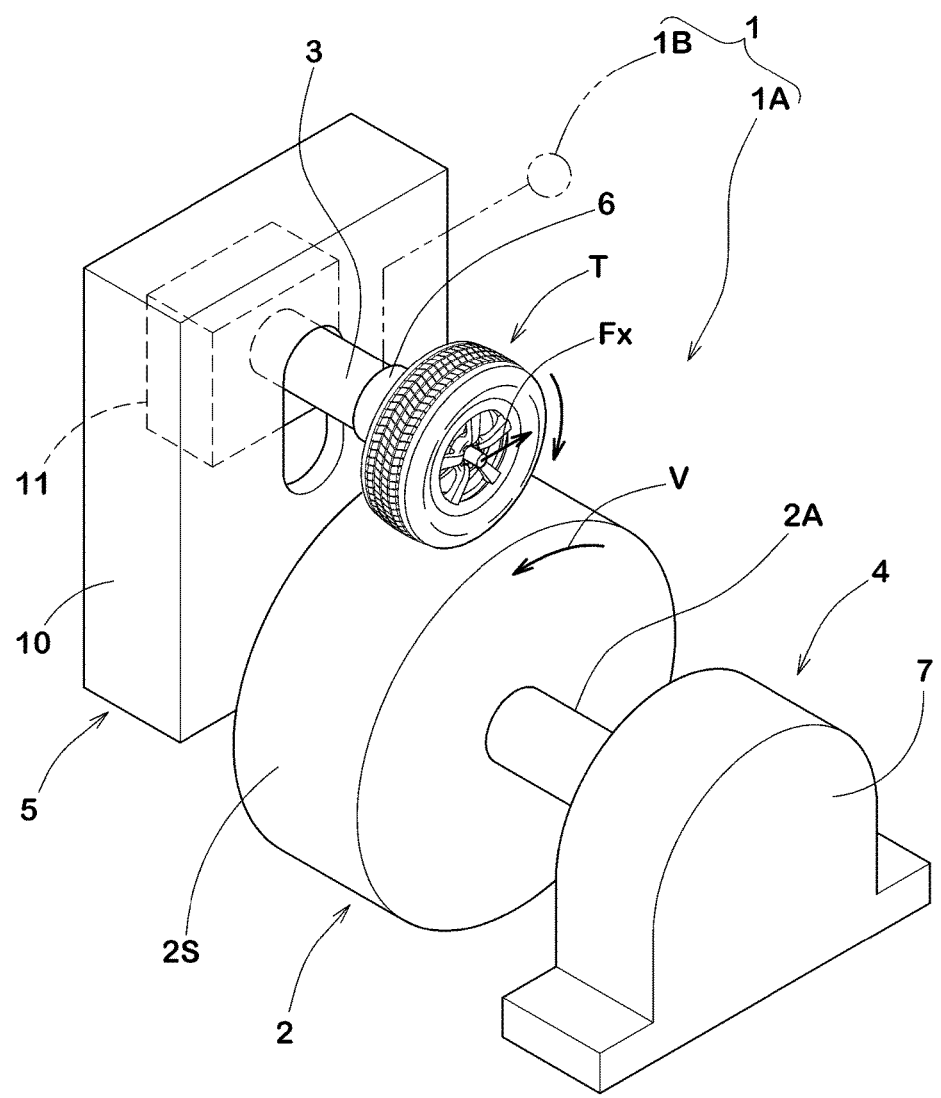
FIG. 1 is a perspective view illustrating an embodiment of a testing device for carrying out the rolling resistance testing method of a tire of the present invention.

Hereinafter, an embodiment of the present invention will be described in detail. As illustrated in FIG. 1, a rolling resistance testing device 1 of a tire in accordance with the present embodiment (simply referred to as "rolling resistance testing device 1") includes a main body 1A and a determination unit 1B.

The main body 1A is configured to be able to measure rolling resistance Fr of a tire based on a tangential force Fx acting on a tire axle 3 when the tire is rotated by being pushed against an outer surface 2S of a drum 2 which is rotating. Specifically, the main body 1A includes the drum 2, a drum driving device 4, a tire holder 5 and a force component meter 6. The outer surface 2S of the drum 2 is configured as a road surface for the tire. The drum driving device 4 drives the drum 2 around its central axis. The tire holder 5 is configured to rotatably support the tire T and to be able to press the held tire T against the outer surface 2S of the drum 2 to rotate the tire T. The force component meter 6 is configured to measure a tangential force Fx generating on the tire axle 3 of the tire T which is rotating. Note that the main body 1A may include an internal pressure adjustment device for adjusting the inner pressure of the tire T under measurement.

The drum driving device 4 includes a drum holder 7 and a motor (not illustrated). The drum holder 7 rotatably supports a central axle 2A of the drum 2. The motor drives the drum 2 rotationally through an output shaft coupled to the central axle 2A. Then, a speed V of the outer surface 2S of the drum 2 (i.e. a running speed of the tire T) can freely be adjustable by controlling the rotational speed of the motor.

The tire holder 5 includes a base 10, a movable table 11 and the tire axle 3. The movable table 11 is movably mounted on the base 10 in a drum radial direction. The tire axle 3 is arranged in parallel with the central axle 2A of the drum 2, and a first end of the tire axle 3 is supported by the movable table 11. Furthermore, a second end of the tire axle 3 is supposed to rotatably support the tire T. In this embodiment, the movable table 11 is configured as a lifting table that is movable up and down. Furthermore, the movable table 11 can support the tire T such that the center axis of the tire T is located within a vertical standard plane that passes the center axis of the drum 2. Accordingly, the tire holder 5 can vertically press the tire T mounted on the tire axle 3 with an arbitrary tire load against the outer surface 2S of the drum 3 by a downward movement of the movable table 11.

The force component meter 6, for example, may be fixed to a bearing of the tire axle 3, and is configured to be able to measure a tangential force Fx acting on the tire axle 3. In this embodiment, the force component meter 6 can measure a radial force Fz acting (i.e., vertical force) on the tire axle 3 in the radial direction of the drum, at the same time, in addition to the tangential force Fx. As the force component meter 6, a multi-component force meter such as a two-component force meter and the like can preferably be employed.

The determination unit 1B, for example, is configured as an arithmetic processing unit or a part of it, such as a computer and the like. Then, the determination unit 1B performs a comparison and determination in a determination step S3 of the rolling resistance testing method described below.

Figure 2:
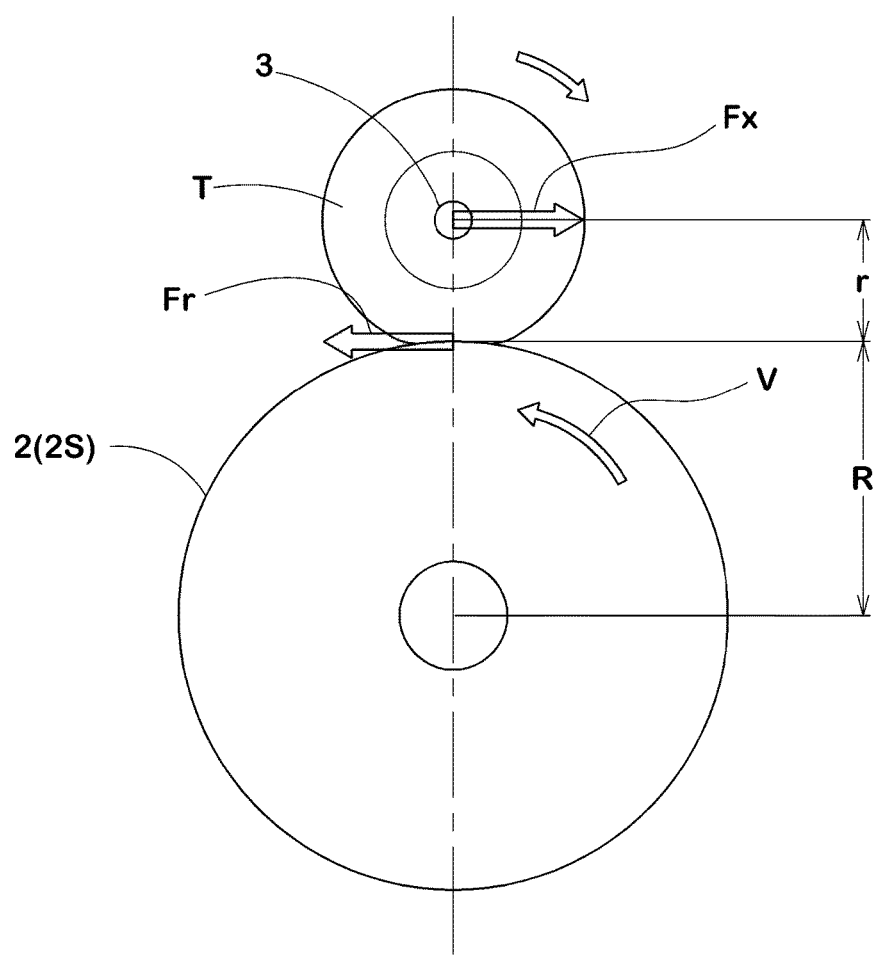
FIG. 2 is a conceptual diagram illustrating the rolling resistance testing method.

Next, as conceptually illustrated in FIG. 2, the rolling resistance testing method is to measure rolling resistance Fr of the tire T based on a tangential force Fx acting on the tire axle 3 when the tire T is rotating by being pushed against the outer surface 2S of the drum 2 which is rotating.

Figure 3:
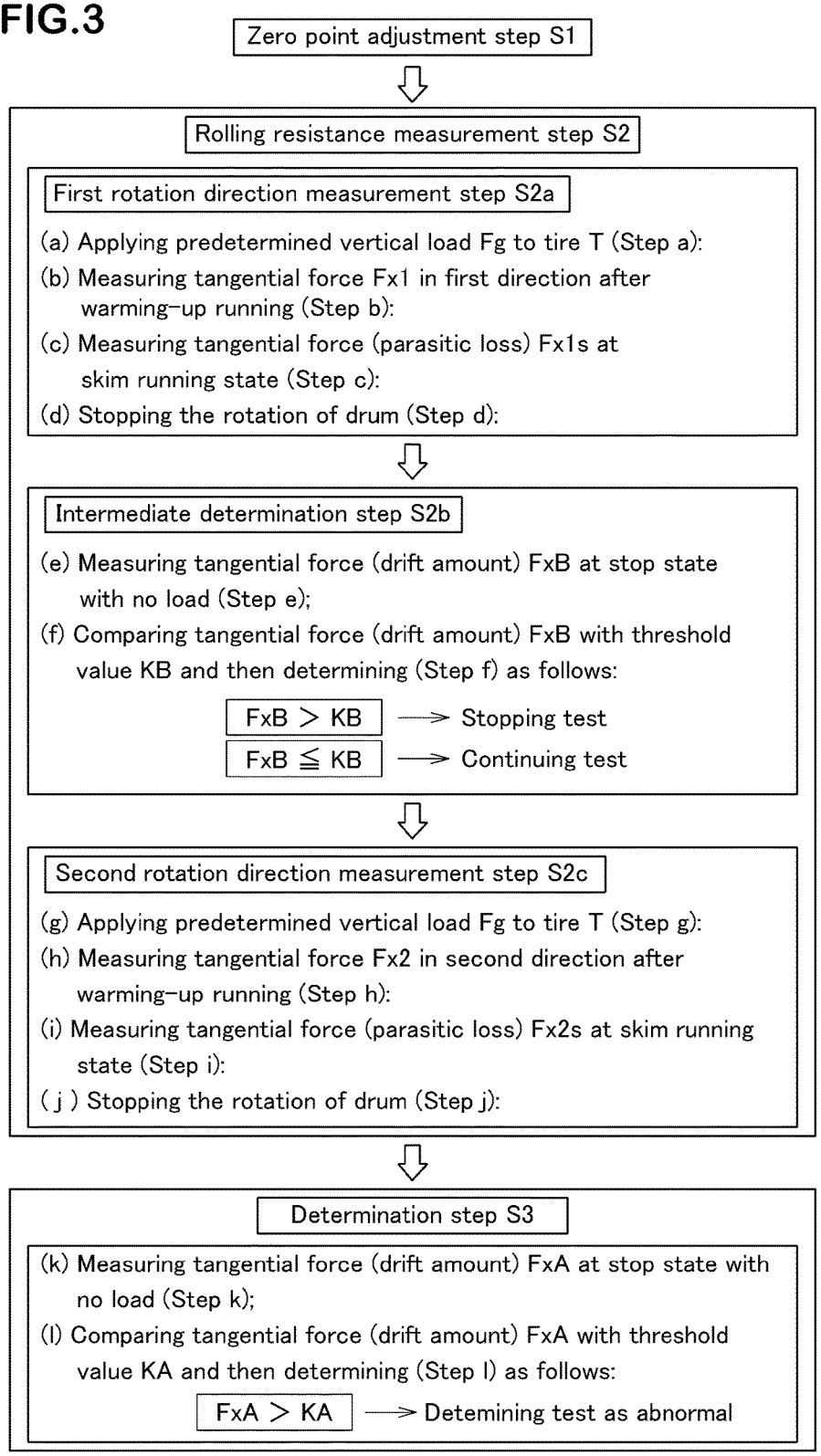
FIG. 3 is a flowchart illustrating the rolling resistance testing method.

Specifically, as the flowchart illustrated in FIG. 3, the rolling resistance testing method includes a zero point adjustment step S1, a rolling resistance measurement step S2 and the determination step S3. In the zero point adjustment step S1, the component force meter 6 is adjusted so that the indication or output signal shows zero after mounting the tire T, which has already been inflated, on the tire axle 3.

Next, in the rolling resistance measurement step S2, the tire T is forced to rotate with a load by being pushed against the outer surface 2S of the drum 2 which is rotating, and then a tangential force Fx acting on the tire axle 3 is measured using the component force meter 6. In this embodiment, the rolling resistance measurement step S2 includes a first rotation direction measurement step S2a of measuring a tangential force Fx1 from the tire rotating in a first direction in a loaded state, a second rotation direction measurement step S2c of measuring a tangential force Fx2 from the tire rotating in a second direction in the loaded stated and an intermediate determination step S2b therebetween.

Specifically, in the first rotation direction measurement step S2a, the following steps of (a) to (d) are sequentially conducted after the zero point adjustment step S1:

(a) applying a predetermined vertical load Fg to the tire T by pushing the tire T against the outer surface 2S of the drum 2 (e.g., 80% of the maximum load capacity) (Step a);

(b) measuring the tangential force Fx1 in the loaded state under the vertical force Fg while being rotated the drum 2 in the first direction at a certain speed V (e.g., 80 km/h) after a warming-up running in a certain time Ts (e.g., 30 minutes) (Step b);

(c) measuring parasitic loss which is a tangential force Fx1s at a skim running state where the tire T is rotating while maintaining the above mentioned speed V with a skim load Fs (e.g., 0.1 kN) after reducing the vertical load Fg to the skim load Fs (Step c); and (d) stopping the rotation of drum (Step d).

Note that the vertical force Fg, the skim load Fs, the speed V, the time Ts for warming-up running and the like are set in accordance with specifications of the rolling resistance test such as JIS Standard (JIS D4234) and International standard (ISO 28580) and the like.

Furthermore, in the intermediate determination step S2b, the following steps (e) and (f) are sequentially performed after the first rotation direction measurement step S2a:

(e) measuring drift amount FxB which is a tangential force FxB at a stop state of the tire T being separated from the drum 2 and loaded with no tire load (Step e); and (f) comparing the tangential force (i.e., the drift amount) FxB with a previously determined threshold value KB and then determining either stopping the test as abnormal in case of the tangential force FxB exceeding the threshold value KB (FxB>KB) or continuing the test as normal in case of the tangential force FxB not exceeding the threshold value KB (FxB<=KB) (Step f).

Furthermore, in the second rotation direction measurement step S2c, the following steps of (g) to (j) are sequentially conducted after the intermediate determination step S2b:

(g) applying the above mentioned vertical load Fg to the tire T by pushing the tire T against the outer surface 2S of the drum 2 (Step g);

(h) measuring the tangential force Fx2 in the loaded state under the vertical force Fg while being rotated the drum 2 in the second direction at the above mentioned speed V after a warming-up running in the above mentioned time Ts (Step h);

(i) measuring parasitic loss which is a tangential force Fx2s at the skim running state where the tire T is rotating while maintaining the above mentioned speed V with the above mentioned skim load Fs after reducing the vertical load Fg to the skim load Fs (step i); and (j) stopping the rotation of drum (Step j).

Furthermore, in the determination step S3, the following steps (k) and (l) are sequentially performed after the rolling resistance measurement step S2 (i.e., after the second rotation direction measurement step S2c in this embodiment):

(k) measuring drift amount FxA which is a tangential force FxA at the stop state of the tire T being separated from the drum 2 and loaded with no tire load (Step k); and (l) comparing the tangential force FxA (i.e., the drift amount FxA) with a previously determined threshold value KA, and then determining the test as abnormal in case of the tangential force FxA exceeding the threshold value KA (Step l).

Figure 4:
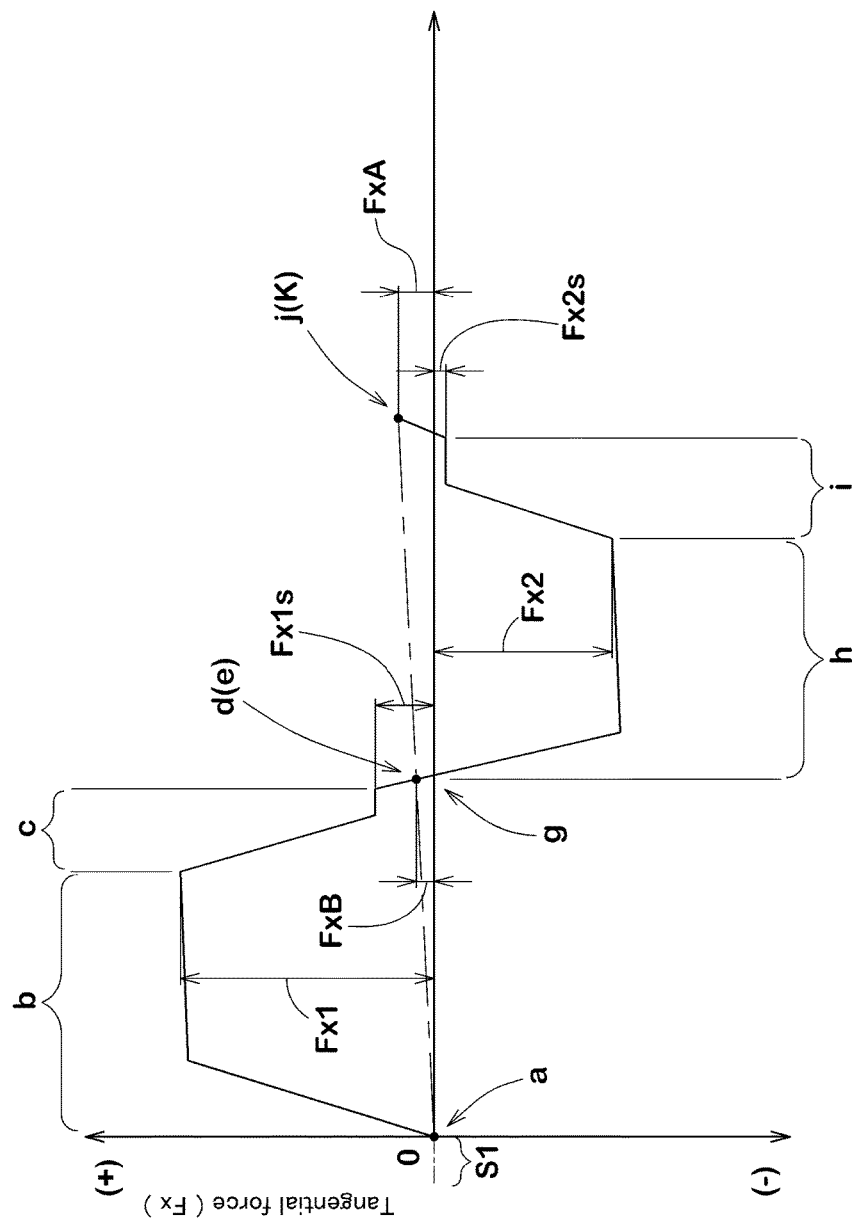
FIG. 4 is a graph showing a relationship between a tangential force measured on the basis of the flow chart and an elapsed time of the test.

FIG. 4 illustrates a graph showing a relationship between the tangential force Fx measured on the basis of the flow chart and an elapsed time of the test. As illustrated in FIG. 4, in Step a, the tangential force Fx has not been generated since the drum 2 is not rotated. In Step b, the tangential force Fx is increasing according to increase of the speed, and then the tangential force Fx is stabilized during the warming-up running after reaching a predetermined speed V (e.g., 80 km/h). Furthermore, the tangential force Fx1 is measured for about one minute during running after the warming-up. In Step c, the tangential force Fx decreases according to decrease of load from the vertical load Fg to the skim load Fs. Then, the tangential force Fx1s (i.e., parasite loss) is measured for about one minute during the skim running.

After stopping the rotation of the drum in Step d, Step e is subsequently performed. In the stop state with no load in Step e, the tangential force Fx has to be zero properly. Accordingly, the tangential force FxB measured in Step e is a false output based on the drift (zero-point shifting) on the force component meter 6, and which is an error. Therefore, when the tangential force (the drift amount) FxB is large, even when corrected, it lowers the accuracy and reliability of the measurement values. Thus, Step f of the present embodiment compares the tangential force FxB (i.e., the drift amount) with a previously determined threshold value KB, and then stops the test as abnormal in case of the tangential force FxB exceeding the threshold value KB. This makes it possible to find out an measurement abnormality due to drift quickly to reduce the waste of measuring time.

Furthermore, after applying the vertical load Fg in Step g, the tire T and the drum 2 start to rotate in the second direction. In Step h, the tangential force Fx is increasing according to increase of the speed, and then the tangential force Fx is stabilized during the warming-up running after reaching a predetermined speed V (e.g., 80 km/h). Note that the reason why the tangential force is not constant is an influence of drift of the force component meter 6. The tangential force Fx2 is measured for about one minute during running after the warming-up. In Step i, the tangential force Fx decreases according to a decrease of load from the vertical load Fg to the skim load Fs. Then, the tangential force Fx2s (i.e., parasitic loss) is measured for about one minute during the skim running.

After stopping the rotation of the drum in Step j, Step k is subsequently performed. The tangential force FxA measured in Step k, as same as the tangential force FxB measured in Step e, is a false output based on the drift (zero-point shifting) on the force component meter 6. Therefore, when the axial force (the drift amount) FxA is excessively large, even when corrected, it lowers the accuracy and reliability of the measurement values. Thus, Step l of the present embodiment compares the tangential force FxA (i.e., the drift amount) with a previously determined threshold value KA, and then determines the test as abnormal in case of the tangential force FxA exceeding the threshold value KA. This makes it possible to exclude the obtained rolling resistance Fr from the evaluation.

Although the threshold values KA and KB are not particularly limited, they are preferable to be set in consideration with a large number of tangential force FxA and FxB that is actually measured by the pre-test. Also, the comparison and determination in step l is carried out by the determination unit 1B.

Furthermore, when FxA<=KA, the test is determined as normal, and the rolling resistance Fr is calculated based on the measured values of tangential force Fx1, tangential force Fx1s (i.e., parasitic loss), the tangential force FxB (i.e., drift amount), the tangential force Fx2, the tangential force Fx2s (i.e., parasitic loss) and the tangential force FxA (i.e., drift amount).

Figure 5:
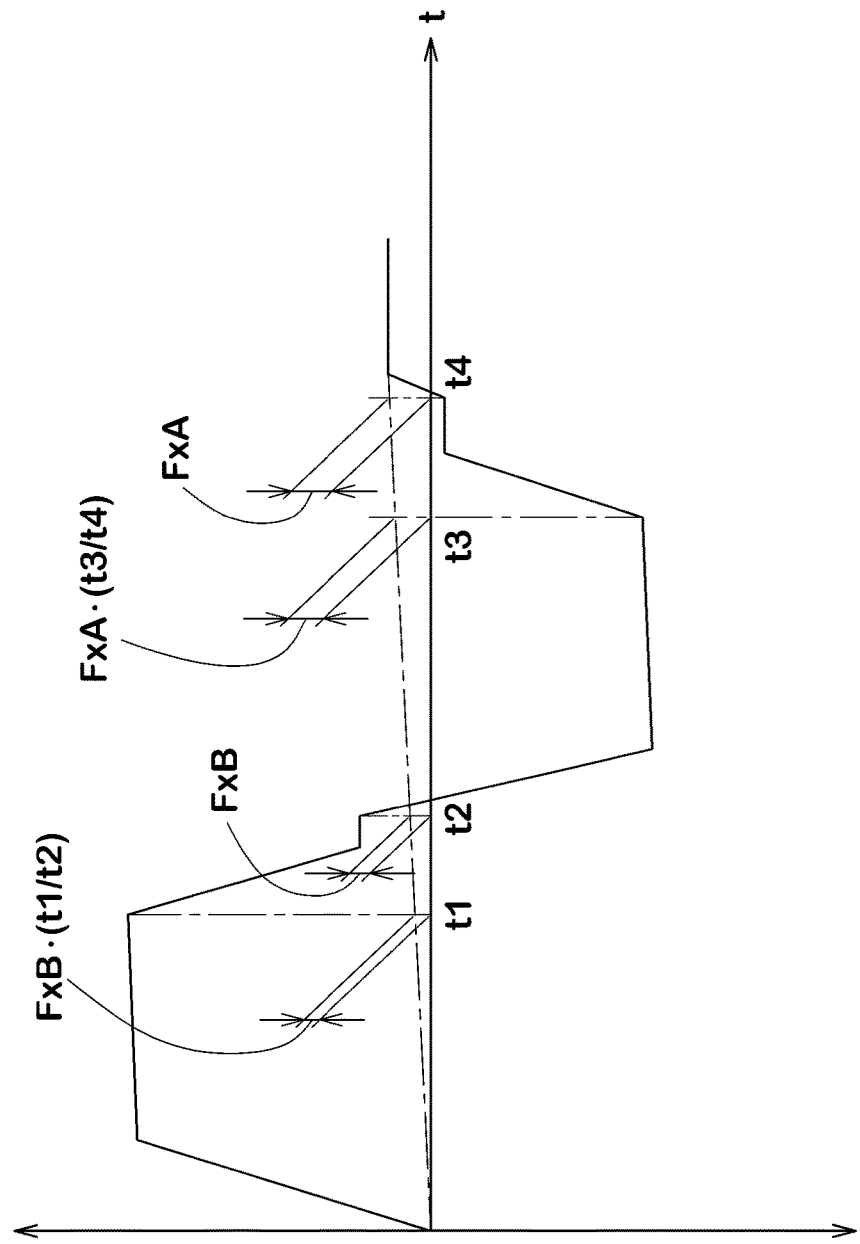
FIG. 5 is a graph illustrating an example of a method for calculating the rolling resistance.
Figure 6:
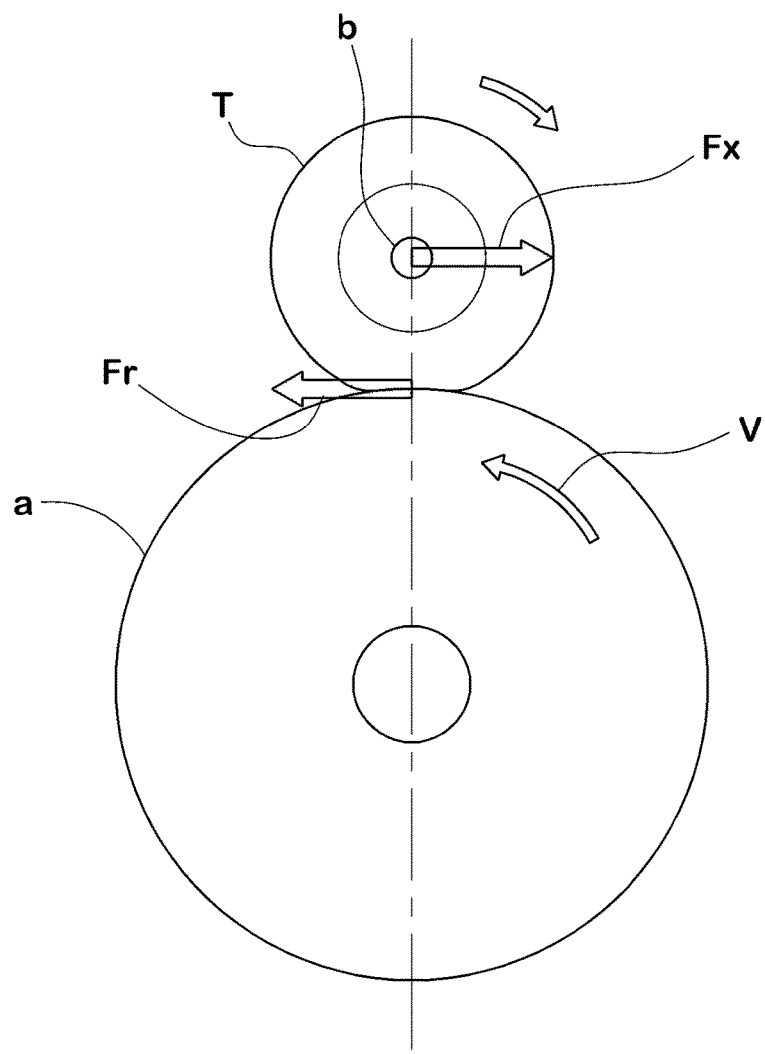
FIG. 6 is a conceptual diagram illustrating a conventional rolling resistance test method by the force method.

As for one example of a calculating method of the rolling resistance Fr, for example, the following equation could be employed in case that the measured period for the tangential force Fx1s (parasitic loss) approaches to the measured period for the tangential force FxB (drift amount) and that the measured period for the tangential force Fx2s (parasitic loss) approaches to the measured period for the tangential force FxA (drift amount), as shown in FIGS. 4 and 5.

$$Fr=\{(F1+F2)/2\}x\{(R+r)/R\}$$

$$F1=\{Fx1-FxB\cdot(t1/t2)\}-\{Fx1s-FxB\}$$

$$F2=\{Fx2+FxA\cdot(t3/t4)\}-\{Fx2s+FxA\}$$

Here, t1 is an elapsed time at the time of measurement of the tangential force Fx1, t2 is an elapsed time at the time of measurement of the tangential force Fx1s (parasitic loss9, t3 is an elapsed time at the time of measurement of the tangential force Fx2, and t4 is an elapsed time at the time of measurement of the tangential force Fx2s (parasitic loss). Furthermore, in the equation, F1 is a tangential force that is corrected based on the parasitic loss and the drift amount in the first rotation direction measurement step S2a, F2 is a tangential force that is corrected based on the parasitic loss and the drift amount in the second rotation direction measurement step S2c, R is a radius of the drum 2 as shown in FIG. 2, r is a distance between the axial center of the tire axle 3 during running and the outer surface 2S of the drum 2 as shown in FIG. 2.

As another example of the rolling resistance measurement step S2, the intermediate determination step S2b may be omitted, i.e., the rolling resistance measurement step S2 may consist of the first rotation direction measurement step S2a and the second rotation direction measurement steps S2b. In this case, the rolling resistance Fr can be calculated using the following equation;

$$Fr=\{(F1+F2)/2\}x\{(R+r)/R\}$$

$$F1=\{Fx1-FxA\cdot(t1/t4)\}-\{Fx1s-FxA\cdot(t2/t4)\}$$

$$F2=\{Fx2-FxA\cdot(t3/t4)\}-\{Fx2s-FxA\}$$

Furthermore, yet another example of the rolling resistance measurement step S2, the intermediate determination step S2b and the second rotation direction measurement step S2b may be omitted, i.e., the rolling resistance measurement step S2 may consist of only the first rotation direction measurement step S2a. In this case, the rolling resistance Fr can be calculated using the following equation.

$$Fr=\{F1x\{(R+r)/R\}$$

$$F1=\{Fx1-FxB\cdot(t1/t2)\}-\{Fx1s-FxB\}$$

$$FxB=FxA$$

In any of the above examples, since the determination step S3 can identify the abnormalities of the test, if there is an abnormality, the obtained rolling resistance Fr can be excluded from the evaluation to improve the measurement accuracy and reliability of rolling resistance.

While a particularly preferred embodiments of the present invention have been described in detail, the present invention is not be limited to the embodiments as shown, but it may be carried out by modifying to various aspects.

REFERENCE SIGNS LIST

1 Rolling resistance testing device
1B Determination unit
2 Drum
2S Outer surface
3 Tire axle
6 Force component meter
S1 Zero adjustment step
S2 Rolling resistance measurement step
S2a First rotation direction measurement step
S2b Intermediate determination step
S2c Second rotation direction measurement step
S3 Determination step
T Tire

The invention claimed is:

1. A tire rolling resistance testing method for measuring rolling resistance of a tire based on a tangential force (Fx) acting on a tire axle upon the tire rotating by being pushed against an outer surface of a rotating drum, the method comprising the steps of:
a zero point adjustment step of adjusting a value of a component force meter to zero point after mounting the tire inflated on the tire axle;
a rolling resistance measurement step of measuring a tangential force (Fx) acting on the tire axle using the component force meter upon the tire rotating with a load by being pushed against the outer surface of the rotating drum; and
a determination step comprising:
measuring a tangential force (FxA) of the tire axle in a stop state of the tire being separated from the drum with no load, after the rolling resistance measurement step;
comparing the tangential force (FxA) with a previously determined threshold value (KA); and
determining the test as abnormal in case of the tangential force (FxA) exceeding the threshold value (KA).

2. The tire rolling resistance testing method according to claim 1, wherein the tangential force (Fx) is measured upon the tire rotating in a first direction with a load by being pushed against the outer surface of the rotating drum in the rolling resistance measurement.

3. The tire rolling resistance testing method according to claim 1, wherein the rolling resistance measurement step comprises a first rotation direction measurement step of measuring a tangential force (Fx1) from the tire rotating in a first direction, and a second rotation direction measurement step of measuring a tangential force (Fx2) from the tire rotating in a second direction, with a load by being pushed against the outer surface of the rotating drum.

4. The tire rolling resistance testing method according to claim 3,
wherein the rolling resistance measurement step further comprises an intermediate determination step between the first rotation direction measurement step and the second rotation direction measurement step, and the intermediate determination step comprises
measuring a tangential force (FxB) of the tire axle in a stop state of the tire being separated from the drum with no load, after the first rotation direction measurement step, comparing the tangential force (FxB) with a previously determined threshold value (KB), and stopping the test as abnormal in case of the tangential force (FxB) exceeding the threshold value (KB).

5. A tire rolling resistance testing device for performing the rolling resistance testing method according to claim 1, wherein the device comprises a determination means to determine a result of the test abnormal in case of the tangential force (FxA) exceeding the threshold value (KA).

* * * * *